United States Patent
Greenberg et al.

(10) Patent No.: US 7,347,562 B2
(45) Date of Patent: Mar. 25, 2008

(54) TWO-PANEL LIQUID-CRYSTAL-ON-SILICON COLOR MANAGEMENT SYSTEM

(75) Inventors: Michael R. Greenberg, Santa Rosa, CA (US); Anthony D. McGettigan, Santa Rosa, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 189 days.

(21) Appl. No.: 11/131,635

(22) Filed: May 18, 2005

(65) Prior Publication Data

US 2005/0259225 A1    Nov. 24, 2005

Related U.S. Application Data

(60) Provisional application No. 60/573,070, filed on May 21, 2004.

(51) Int. Cl.
*G03B 21/00* (2006.01)
(52) U.S. Cl. .............................. 353/31; 353/82; 353/84; 353/94
(58) Field of Classification Search .................. 353/82, 353/84, 94
See application file for complete search history.

(56) References Cited

U.S. PATENT DOCUMENTS

| | | | |
|---|---|---|---|
| 5,353,133 A * | 10/1994 | Bernkopf | 349/5 |
| 5,517,340 A | 5/1996 | Doany et al. | |
| 5,739,809 A * | 4/1998 | McLaughlin et al. | 345/594 |
| 5,863,125 A | 1/1999 | Doany | |
| 6,280,034 B1 | 8/2001 | Brennesholtz | |
| 6,388,718 B1 | 5/2002 | Yoo et al. | |
| 6,568,815 B2 | 5/2003 | Yano et al. | |
| 6,650,377 B2 | 11/2003 | Robinson et al. | |
| 6,702,446 B2 | 3/2004 | De Vaan et al. | |
| 6,707,516 B1 | 3/2004 | Johnson et al. | |
| 6,816,309 B2 * | 11/2004 | Chen et al. | 359/498 |
| 6,962,414 B2 * | 11/2005 | Roth | 353/20 |

FOREIGN PATENT DOCUMENTS

WO    WO 03007074 A1 *    1/2003

* cited by examiner

*Primary Examiner*—Patrick Assouad
*Assistant Examiner*—Warren K Fenwick
(74) *Attorney, Agent, or Firm*—Allen, Dyer, Doppelt, Milbrath & Gilchrist, P.A.

(57) ABSTRACT

A two-panel projection display system includes a color wheel having color filter segments that transmit light having a secondary color, namely cyan, magenta, and yellow, made up of two primary colors. A primary color separator, such as a second color wheel, a transflective dichroic beamsplitter, or a color-sensitive polarizing switch separates the secondary color beam into a first polarized primary color beam and a second polarized primary color beam, which are directed to first and second imager panels. A beam combiner combines the first polarized primary color beam from the first imager and the second polarized primary color beam from the second imager to form a projection beam. Accordingly, any two primary colors can be imaged at the same time enabling the system to be white point balanced.

12 Claims, 6 Drawing Sheets

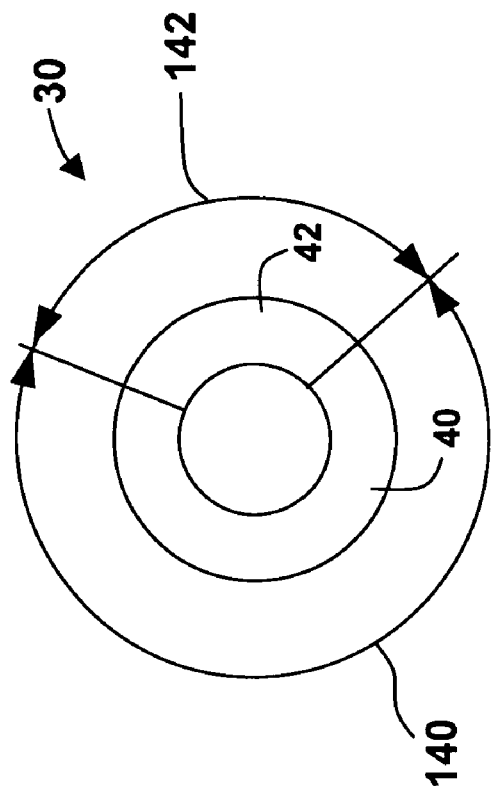
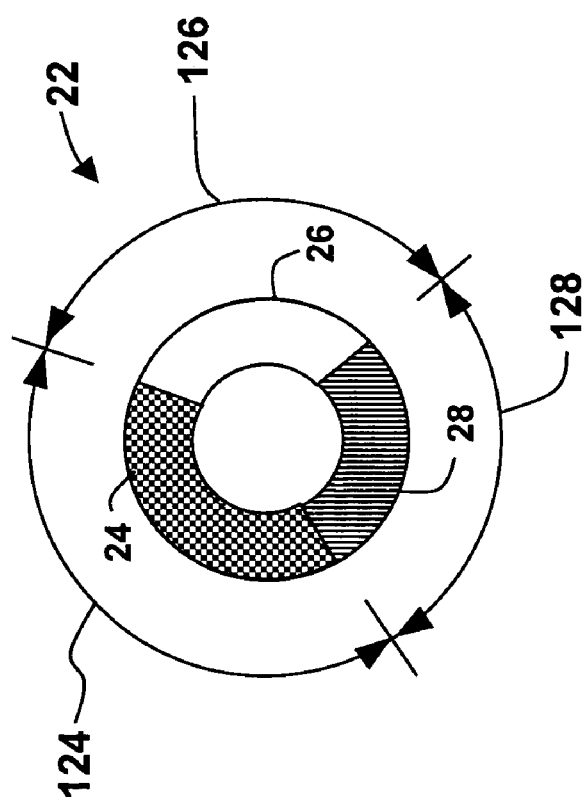
FIGURE 3
FIGURE 2

TWO-PANEL LIQUID-CRYSTAL-ON-SILICON COLOR MANAGEMENT SYSTEM

CROSS-REFERENCE TO RELATED APPLICATIONS

The present invention claims priority from U.S. patent application Ser. No. 60/573,070 filed May 21, 2004, which is incorporated herein by reference.

TECHNICAL FIELD

The present invention relates to a color projection display system, and in particularly to a color display system using multiple imager panels.

BACKGROUND OF THE INVENTION

Projection display systems based on liquid-crystal-on-silicon ("LCoS") microdisplay technology commonly employ one, two, or three LCoS imaging panels in order to create a full color projected image. When three panels are used, each panel is illuminated with one of the three primary colors. Each panel is electronically addressed with video data corresponding to the color channel for the illuminating light received at that imager. Finally these three monochrome images are projected onto the screen simultaneously, resulting in a high brightness image that has no artifacts associated with temporal color sequencing of the image data.

In one panel systems, such as those disclosed in U.S. Pat. No. 6,702,446 issued Mar. 9, 2004 to De Vaan et al, and U.S. Pat. No. 6,707,516 issued Mar. 16, 2004 to Johnson et al, some means of illuminating the single imager is employed, typically either color-sequencing or scrolling a pattern of three primary-colored stripes of light across the imager to create a full color image. The imager is electronically addressed with a time-sequential (and possibly scrolling) video image data stream that modulates in synchrony with the time—(and possibly space—) varying multi-color illumination source.

An imaging system projects a magnified image of this color-sequential (or color scrolling) picture onto a viewing surface where the viewer perceives a full-color image as a result of the human eye's slower response time compared with the rate of color modulation in the imaging system. Due to the color-sequential nature of the one-panel display, a lower-brightness image results as compared with three-panel displays. The image may also include color-breakup artifacts due to the temporal nature of the color sequencing system.

A two-panel architecture is a compromise between these two extremes. There are several schemes for color management in a two-panel architecture. In a first scheme, light from the illumination source is divided into two beams by splitting the raw light into its two constituent, orthogonal polarization states. Each of these beams is routed to one of the two imagers. Both of these two optical paths are modulated with color sequencing or color scrolling means, similar to systems having only a single imager.

The two resulting color-modulated images are recombined using a polarization beam combiner to create a single color-sequential full-color image. The benefit of this approach compared to a one-panel system is a brighter image than that obtained using only one imager. However this system is still not as bright as a three-panel system since some form of temporal color sequencing is still needed. For purposes of convenient discussion, this type of two-panel system shall hereinafter be referred to as a Polarization-Divided Color Sequential (alternatively "Color Scrolling") ("PDCS")-type two-panel system.

In a second scheme disclosed in U.S. Pat. No. 6,280,034 issued Aug. 28, 2001 to Brennesholtz, and U.S Pat. No. 6,388,718 issued May 14, 2002 to Yoo et al, light from the source is spectrally divided into two beams such that one of the beams consists of light from a single primary color channel (for instance only red light) and the second beam consists of light from the remaining two primary color channels (green and blue light, for example). The color system used herein will be the additive color system unless otherwise indicated, including indication by contextual use. In the additive color system, red, blue, and green are the primary colors, and magenta (red+blue), cyan (blue+green) and yellow (red+green) are the secondary colors. Those of skill in the art appreciate that magenta, cyan, and yellow are called primary colors in the subtractive color system, which is often used in describing printing systems, for example.

Light from the first beam is routed to one of the panels so that this panel continuously receives one primary illumination color and displays image data corresponding to this one primary color. The second beam, consisting of light from the two remaining primary colors, is directed to the second imaging panel. Color sequencing or color scrolling means are used to temporally sequence the two primary colors of the second beam onto the imaging panel.

The imaging panel is electronically addressed with a time-sequential video image data stream that modulates in synchrony with the time-varying (and possibly space-varying, e.g. scrolling) two-color illumination source.

The images from the two imaging panels are optically combined using a dichroic beam-combining element and are projected onto a screen or viewing surface to create a full-color image. This system may optionally include a polarization recovery subsystem in the illumination subsystem to increase overall display brightness. Nevertheless, the resulting image is less bright than a full three-panel system due to the temporal color sequencing in the two-color imager. However, it is typically brighter than a one panel system because it is capable of simultaneously projecting two overlapping, full-frame color images, whereas the single panel system only displays one full-frame color image at any instant in time. This latter type of two-panel system shall hereinafter be referred to as a Basic Color-Divided Color Sequential (or Color Scrolling) ("BCDCS")-type two-panel system.

U.S. Pat. No. 5,517,340 issued May 14, 1996 to Doany et al, and U.S. Pat. No. 5,863,125 issued Jan. 26, 1999 to Doany disclose two-panel schemes in which color wheels are used to sequentially provide one of the primary colors to a polarization beam splitting cube for projection. Moreover, U.S. Pat. No. 6,568,815 issued May 27, 2003 to Yano et al, and U.S. Pat. No. 6,650,377 issued Nov. 18, 2003 to Robinson et al disclose dual-panel systems in which a series of active and passive polarizing filter stacks are used to control which primary and or secondary colors are provided to the panels.

An object of the present invention is to overcome the shortcomings of the prior art by providing a two-panel LCoS system in which both of the imagers are time-shared between two colors, and in which both polarized and unpolarized light can be used in the initial separation stages.

SUMMARY OF THE INVENTION

Accordingly, the present invention relates to a color management system comprising:

a light source for generating a source beam of polarized or unpolarized light;

a secondary color selector for selectively separating a first or a second secondary color beam from the polarized or unpolarized source beam of light, the first secondary color beam comprising first and second primary colored beams, and the second secondary colored beam comprising first and third primary colored beams;

a primary color separator for separating the first secondary colored beam into the first and second primary colored beams, and the second secondary colored beam into the first and third primary colored beams;

a first imager panel for imaging the first or the second primary colored beam;

a second imager panel for imaging the second or the third primary colored beam; and a beam combiner for combining the first primary colored beam from the first imager panel with the second or the third primary colored beam from the second imager panel, or for combining the second colored beam from the first imager panel with the third colored beam from the second imager panel to form a projection beam.

Another aspect of the present invention relates to a color management system comprising:

a light source for generating a source beam of unpolarized light;

a first color wheel having a first secondary color filter segment transmitting a first secondary color beam, a second secondary color filter segment transmitting a second secondary color beam, and a third secondary color filter segment transmitting a third secondary color beam, the first color wheel rotatable for sequentially coupling one of the first color filter segment, the second color filter segment and the third color filter segment to the source beam;

a light integrator for homogenizing the first, second and third secondary color beams;

a polarization conversion element for polarizing the first, second and third secondary color light beams;

a primary color separator for separating the first secondary color beam into first and second primary color beams and directing the first and second primary color beams along first and second paths, respectively, for separating the second secondary color beam into first and third primary color beams and directing the first and third primary color beams along the first and second paths, respectively, and for separating the third secondary color beam into second and third color beams and directing the second and third color beams along the first and second paths, respectively;

a first imager panel for receiving the first or second primary color beams along the first path, and imaging the first or second primary color beams;

a second imager panel for receiving the second or third primary color beams along the second path, and imaging the second or third primary color beams; and a beam combiner for combining the first color beam from the first imager panel with the second or the third primary color beam from the second imager panel, or for combining the second color beam from the first imager panel with the third color beam from the second imager panel to form a projection beam.

BRIEF DESCRIPTION OF THE DRAWINGS

The invention will be described in greater detail with reference to the accompanying drawings which represent preferred embodiments thereof, wherein:

FIG. 2 is a plan view of a first color wheel suitable for use in embodiments of the present invention, such as the embodiment of FIGS. 1 and 4 to 7;

FIG. 3 is a plan view of a second color wheel suitable for use in embodiments of the present invention, such as the embodiment of FIG. 1;

DETAILED DESCRIPTION

Brightness in the systems described above is also limited by the requirement that the overall system be "white-point balanced." White-point balanced refers to the need to limit the maximum brightness of two of the displayed color channels in proper relation to the third, which is referred to as the "brightness-limiting color channel," in order that the white state, i.e. when all color channels are turned up to maximum balanced brightness, of the system match some specified color temperature corresponding to the color of a blackbody radiator of a given temperature, typically between 6,000° K and 12,000° K. In the BCDCS-type two-panel system described above, color assignments to the fixed-color and two-color panels can be made arbitrarily. However, to achieve a maximally bright color-balanced system, the color channel that would limit the overall white-balanced brightness of a three-panel system should be assigned to the non-color-sequencing imager, i.e. the fixed color panel. Due to the spectral output distribution of typical high pressure mercury vapor arc lamps used in many projection displays, the red color channel typically limits the color-balanced brightness of three-panel systems, and as such would typically be assigned to the fixed color panel. Alternatively, another color is the brightness-limiting color.

The two-color panel's temporal duty cycle between the green and blue states can be adjusted to white-point balance the resulting system. When a color wheel is used as the color sequencing mechanism for such a system, white-point balancing can be accomplished by adjusting the relative angular extents of the blue and green dichroic segments of the color wheel until the fixed color channel is white-balanced relative to the two-color channel.

Since the fixed-color channel has the benefit of displaying its single-color image data continuously, the maximum brightness of this color channel is typically lowered to white-balance its brightness with that of the two-color, time-shared imager. Such balancing can be accomplished by lowering the duty cycle of the fixed-color imager. In such a scheme, the fixed-color imager would simply be driven to a 'dark-state' condition for some fraction of the time during each frame of video data.

Overall image brightness is increased if part of this dark-state time of the fixed-color imager is used to display image data of one of the other colors. The result would essentially amount to a two-panel system where both imagers are time-shared between two colors. Such a system, properly color balanced, would be brighter than a BCDCS-type two-panel system. This novel type of two-panel projection display system is hereinafter referred to as an Enhanced Color-Divided Color Sequential (or Scrolling) ("ECDCS")-type two-panel system.

Figure 1:
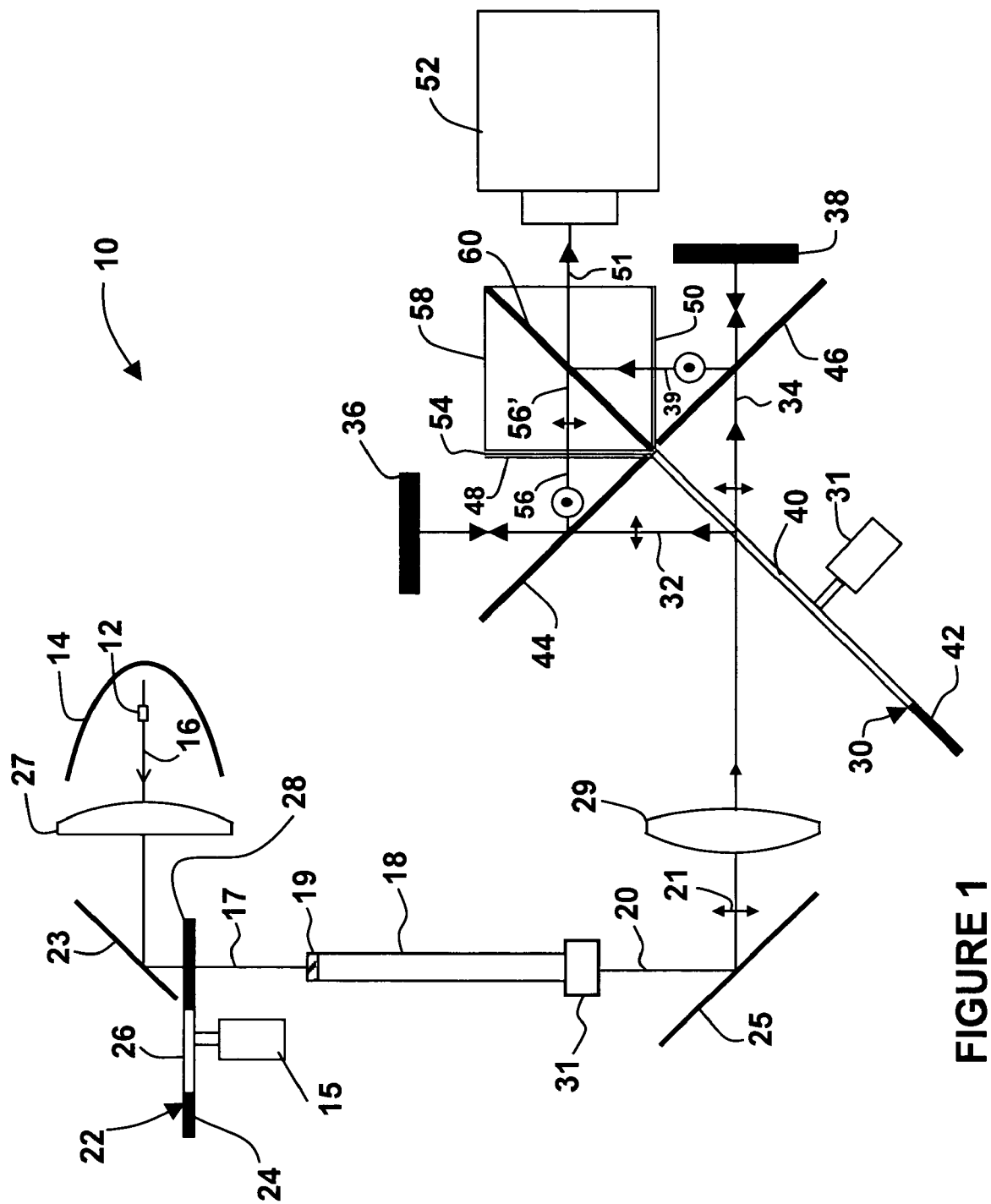
FIG. 1 illustrates a color management system in accordance with an embodiment of the present invention.

FIG. 1 illustrates a color management system 10, according to an embodiment of the present invention, in which a light source, in the form of a lamp 12 with an arc 14, produces a beam of light 16 of essentially white light having more than one polarization state, e.g. unpolarized. Alternatively, the lamp can be a filament-based lamp.

A first secondary color selector, in the form of a color wheel 22, includes first (e.g. magenta) 24, second (e.g. yellow) 26 and third (e.g. cyan) 28 secondary color segments, see FIG. 2 for a plan view of the color wheel 22, rotated by a motor 15 to sequentially pass (transmit) an unpolarized secondary color beam 17 comprised of a first, second or third additive secondary color beam (e.g. magenta, yellow and cyan, respectively) selected by the first color wheel 22.

A light integrating light pipe 18, with a polarization converter 19 on the input end thereof, is used to create a polarized, homogenized illumination beam, e.g. polarized, secondary-color beam 20, from the unpolarized secondary color beam 17. In other words, the polarized beam 20 has been converted to essentially a single polarization state, as indicated by the double-ended arrow 21, which according to standard convention designates a "p-type" polarization state. The p-type polarization state is arbitrarily chosen for purposes of discussion, and those of skill in the art appreciate that s- and p-type polarization is defined in reference to a selected plane, and the s-type state is chosen is alternative embodiments.

Preferably, the polarization converter 19 is comprised of a plurality of corner-cube-type polarization converters, e.g. polarizing beamsplitter cubes, on the input end of the light pipe 18. In an alternate embodiment, the lamp 12 is a polarizing lamp providing a light beam having essentially a single polarization state, and the polarization converter 19 is not required. Optional optical elements, such as fold mirrors 23 and 25, a condenser lens 27, and a relay lens 29 provide a compact optical path.

Preferably, a clean-up polarizer 31 is disposed at the output end of the light pipe 18 to remove light not having the selected polarized state. After the polarization converter 19 converts the light 17 from the lamp 12 to the selected polarization state, reflections off the walls of the light pipe 18 rotate the polarization state of some of the light. The ratio of p-polarized to s-polarized light exiting the light pipe 18 is typically about between 3:1 and 5:1. A reflective clean-up polarizer, such as a wire-grid-type polarizer, is generally preferred if the light flux is such that an absorptive polarizer would generate too much heat. If the light exiting the light pipe 18 is highly polarized, an absorptive clean-up polarizer is alternatively used, or may be omitted entirely in some embodiments. In yet other embodiments, corner-cube MacNielle-type polarizers or FTIR polarizers are used as a clean-up polarizer 31, with appropriate adjustment of the illustrated light path(s).

A primary color separator in the form of a second color wheel 30, see FIG. 3, driven by a second motor 31, is disposed at an acute angle, e.g. 45°, to the polarized, secondary-color beam 20 for separating the two primary colors therein into separate primary color beams traveling along perpendicular first and second paths 32 and 34 to illuminate first and second LCoS imager panels 36 and 38, respectively.

For convenience of discussion, the first imager panel 36 will be referred to as a red/blue imager, and the second imager panel 38 will be referred to as a blue/green imager; however, these color designations are arbitrary and can be any possible combination, e.g. in an alternative embodiment one imager is a red/green imager and the other a red/blue imager; and in yet another embodiment, one imager is a red/green imager and the other a red/blue imager.

The color wheel 30 can take several forms, each one for separating the secondary colored light beams into their constituent primary colors. In a simple embodiment, the color wheel 30 has three, or multiples of three, equal sections, at least one for separating the first secondary colored beam, e.g. magenta, into the first and third primary colored light beams, e.g. red and blue light, at least one for separating the second secondary colored beam, e.g. yellow light, into the first and second primary colored light beam, e.g. red and green light, and at least one of separating the third secondary colored beam, e.g. cyan, into the second and third primary colored light beams, e.g. green and blue light.

Alternatively, as illustrated in FIG. 3, the second color wheel 30 can be limited to only two segments, a short wave pass dichroic segment 40 and a long wave pass dichroic segment 42. The second color wheel 30 is synchronized to the first color wheel 22 as follows. When either the first or the second secondary color segments, e.g. magenta (R/B) 24 or yellow (R/G) 26, of the first color wheel 22 are in the optical path, the short-wave-pass dichroic segment 40 of the second color wheel 30 is in the active optical path, and the first primary colored light beam, e.g. red light, is reflected along the first path 32 to the red/blue imager 36 while either the second or the third primary colored light beams, e.g. blue or green light, is transmitted along the second path 34 to the blue/green imager 38.

When the third secondary color segment 28, e.g. cyan (B/G), of the first color wheel 22 is in the optical path, the long-wave-pass dichroic segment 42 of the second color wheel 30 is in the active optical path so that the second primary colored light beam, e.g. green light, is transmitted along the second path 34 to the blue/green imager 38, while the third primary colored light beam, e.g. blue light, is reflected along the first path 32 to the blue/red imager 36. Both the second and third primary colored light beams, e.g. green light and blue light, are transmitted through reflective polarizers 44 and 46, respectively, positioned at acute angles, e.g. 45°, to the first and second paths 32 and 34, respectively.

Preferably, the reflective polarizers 44 and 46 are wire-grid polarizers, but other high-quality reflective polarizers, such as corner-cube-type (MacNielle-type) or frustrated total-internal-reflection ("FTIR")-type polarizers can be used. Those skilled in the art understand that FTIR polarizers pass light having s-type polarization, and reflect light having p-type polarization, and that components and diagrams would be modified accordingly. The reflective polarizers 44 and 46 transmit light of one polarization state, in this example p-polarized light, and reflect light in the orthogonal polarization state, e.g. s-polarized light. It is desirable that the polarizing beam splitters 44 and 46 be of higher quality, i.e. sufficiently optically flat to preserve the quality of the image reflected off of the imager panels 36 and 38.

The LCoS imager panels 36 and 38 rotate the polarization state of imaged, i.e. reflected light, by 90°. Thus, light 39 reflecting from the blue/green imager 38 will be s-polarized, and reflect off the reflective polarizer 46 associated with the blue/green imager 38 towards a polarization beam splitting cube 58, which acts as a polarization beam combiner. Similarly, light 56 reflected by the red/blue imager 36 will be s-polarized, and reflect off the reflective polarizer 44 associated with the red/blue imager 36 towards the polarization beam splitter cube 58. Optional analyzers 48 and 50, also known as sheet polarizers, are disposed in the optical path of the light 56 and 39, adjacent the polarization beam splitting cube 58, for removing light that does not have the selected polarized state from the light coupled to the projection lens 52. Analyzers 48 and 50 are often said to "clean-up" the polarization state of the light 39 and 56 coming from imaging panels 36 and 38. The analyzers 48 and 50 improve the contrast of the eventual displayed image.

A half-wave retarder plate 54 is disposed in the optical path of the light 56 (or 39) for rotating the polarization state from one imager into the opposite state. In this example, s-polarized light 56 reflected off the reflective polarizer 44 from the red/blue imager 36 is rotated to p-polarized light 56'. The polarizing beamsplitter cube 58 has an optical coating layer 60, across a hypotenuse thereof, that transmits the p-polarized light 56' and reflects the s-polarized light 39, thereby forming a combined projection beam 51 toward the projection lens 52. Alternatively, a higher-quality, i.e. optically flat to maintain the image quality from the imaging panels 36 and 38, wire-grid polarized beam combiner can be used.

Conventional color management systems that have fixed, i.e. single-color, imagers can use dichroic filters to combine the light beams from multiple imagers. In this embodiment, the imager panels 36 and 38 image light of different colors, e.g. both imager panels image blue light at different times, so the combining element, namely optical coating layer 60, works on the principle of polarization states, rather than color.

In this case, s-polarization and p-polarization is referenced to the optical coating layer 60, which is typically a stack of optical thin-film layers forming an FTIR, or Mac-Nielle-type, polarizing beamsplitting layer, or alternatively is a high-quality metal-grid polarizer. The polarizing beamsplitter cube 58 combines the p-polarized light from the red/blue imager 36 with the s-polarized light from the blue/green imager 38 to produce a full-color projected image that is imaged by the projection lens 52 to a display screen (not shown). One way to accomplish white-point balancing is by adjusting the relative sizes of the dichroic segments, e.g. 24, 26, 28, 40 and 42, on the first and second color wheels 22 and 30.

FIG. 2 is a plan view of the color wheel 22 suitable for use in embodiments of the present invention, such as the embodiment shown in FIG. 1, 4, 5, 6 and 7. The color wheel 22 permits white balancing of the color management system 10 shown in FIG. 1 by selective adjustment of the angular extents 124, 126 and 128 of each of the three two-color (secondary) transmitting dichroic filter segments 24, 26 and 28, respectively. In other words, by selecting how much of an arc each filter segment occupies.

In this example, each filter segment occupies about 120° of arc, which results in each secondary color being transmitted through the color wheel 22 for an equivalent period of time. However, more red light could be provided by increasing the angular extents of the yellow 26 and magenta 24 filter segments, with a concomitant reduction of the angular extant of cyan filter segment 28, which would transmit red light relatively more of the time. The amount of time red light is transmitted through the filter segments 24 and 26 is electronically coordinated (synchronized) with the first and second LCoS imager panels 36 and 38.

This flexibility in white balancing permits a fully color-balanced system without limiting the duty cycle of either of the two imager panels 36 and 38. The color management scheme according to the present invention provides a higher luminous efficiency than conventional two-panel color management systems. Embodiments of color wheels having "pie shaped" filter segments are particularly desirable for use in color management systems that do not use scrolling color, such as for LCoS panels, whose drive electronics architecture do not use scrolling color illumination schemes. Alternatively, a scrolling color wheel, such as a color wheel having spiral-shaped ("Archimedes spiral") color filter segments are used with imaging panels adaptable to scrolling color techniques. Some embodiments using scrolling color management techniques avoid "spoke light" issues that arise at the filter edges of "pie shaped" ("spoked") filter segments.

Alternative embodiments may have different and/or additional features, e.g. the light source may employ a "fly's eye array" and a flat polarization conversion scheme (PCS) to homogenize the beam of light 16 from the lamp 12 and convert the light of undesired polarization state into the desired polarization state. Alternatively, the system foregoes polarization recovery, and simply removes light having the non-selected polarization.

The color assignments to the first and second imager panels 36 and 38 also could be blue/red+red/green or blue/green+green/red, but these arrangements are unlikely to result in the highest balanced luminous efficiency. In this case, the primary and secondary color sequencing dichroic devices would be reconfigured as appropriate.

A color scrolling version of this architecture is possible using a spatially varying secondary color sequencing device; however, color scrolling secondary colors complicates synchronization of the scrolling device and imaging panels. The first color sequencing device could be a liquid crystal in combination with retarder stack-type color switching system, such as the ROLIC-style or COLORLINK-style devices described previously in reference to the secondary color sequencing device.

FIG. 3 is a plan view of the second color wheel 30. The second color wheel has a short-wave-pass dichroic filter segment 40 and a long-wave-pass dichroic filter segment 42. The second color wheel 30 is synchronized with the first color wheel 22 so that the short-wave-pass dichroic filter segment 40 is in the light path when the magenta filter segment 24 or the yellow filter segments 26 of the first color wheel 22 are in the light path. Accordingly, a red light beam, from either the magenta or yellow light beams, is reflected by the second color wheel 30, and either a blue or a green light beam is transmitted. The long-wave-pass dichroic filter segment 42 is in the light path when the cyan segment 28 of the first color wheel 22 is in the light path, and a green light beam is transmitted to the second imaging panel 38, while a blue light beam is reflected to the first imager panel 36. Those of skill in the art appreciate that various combinations of filter types with various filter edges are possible. For example, the larger filter segment 40 could be a long-wave-pass filter segment that transmits red light to the second imaging panel 38 when illuminated with magenta or yellow light, and reflects blue and green light to the first imager panel 36.

The arc extent 140 of the short-wave-pass dichroic filter segment 40 is synchronized with the arc extents of the yellow and magenta filter 124 and 126 (FIG. 2). In other words, if arc extents on one color wheel are increased or decreased for color balancing, the corresponding arc extents on the other color wheel are also increased or decreased.

Figure 4:
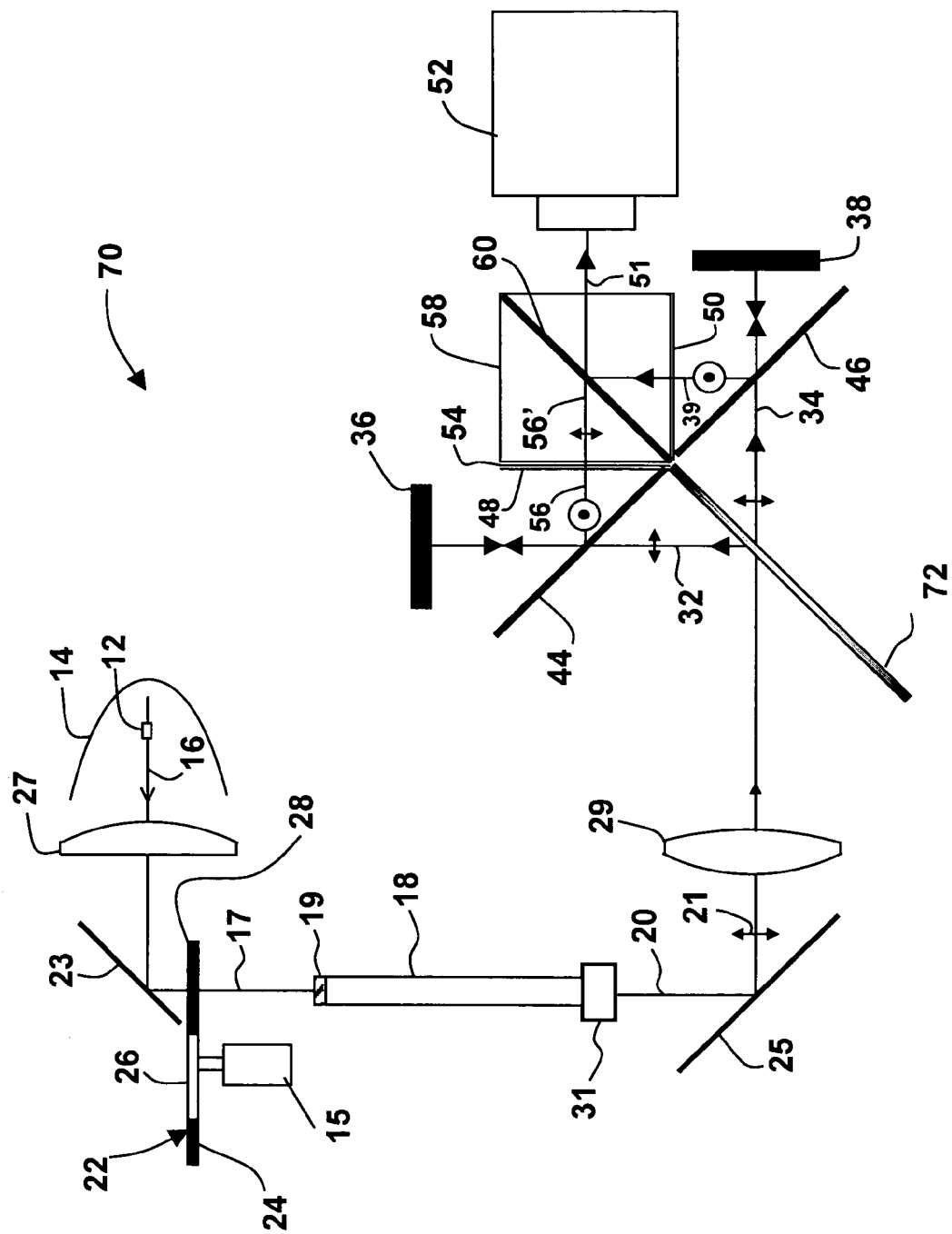
FIG. 4 illustrates a color management system according to another embodiment of the present invention.

FIG. 4 illustrates a color management system 70 according to another embodiment of the present invention, which includes most of the same elements performing in the same fashion as those of the color management system 10 shown in FIG. 1; however, in this embodiment the second color wheel 30 is replaced by another primary color separator in the form of liquid crystal-type transflective dichroic beamsplitter 72. Liquid crystal-type transflective dichroic beamsplitters generally include a combination of static retardation films in combination with electrically addressable liquid crystal retardation film(s). The liquid crystal retardation film(s) permit a transflective beamsplitter to switch from a long-wave-pass function to a short-wave-pass function in synchrony with the color wheel 22 in order to route the illuminating light to the appropriate imager as described above in reference to FIG. 1. Liquid-crystal color switching retarder stacks are available from ROLIC TECHNOLOGIES, LTD., of Allschwil, Switzerland, or alternatively under the trade name COLORSWITCH® from COLORLINK INC., of Boulder, Colo. The transflective dichroic beamsplitter 72 is synchronized with the first color wheel 22 so that the transflective dichroic beamsplitter 72 is functioning as short-wave-pass dichroic filter when the first filter segment 24, e.g. magenta, or the second filter segment 26, e.g. yellow, of the first color wheel 22 are in the light path. Accordingly, the first primary colored light beam, e.g. red, from either of the secondary light beams, e.g. magenta or yellow, is reflected by the transflective dichroic beamsplitter 72 along the first path 32 to the first imager panel 36, and either of the second or third primary colored light beams, e.g. a blue or a green, is transmitted along the second path 34 to the second imager panel 38. The transflective dichroic beamsplitter 72 is set to function as a long-wave-pass dichroic filter when the third secondary filter segment 28, e.g. cyan, of the first color wheel 22 is in the light path, and the third primary colored light beam, e.g. green, is transmitted along the second path 34 to the second imager panel 38, while a second primary light beam, e.g. blue, is reflected along the first path 32 to the first imager panel 36.

Figure 5:
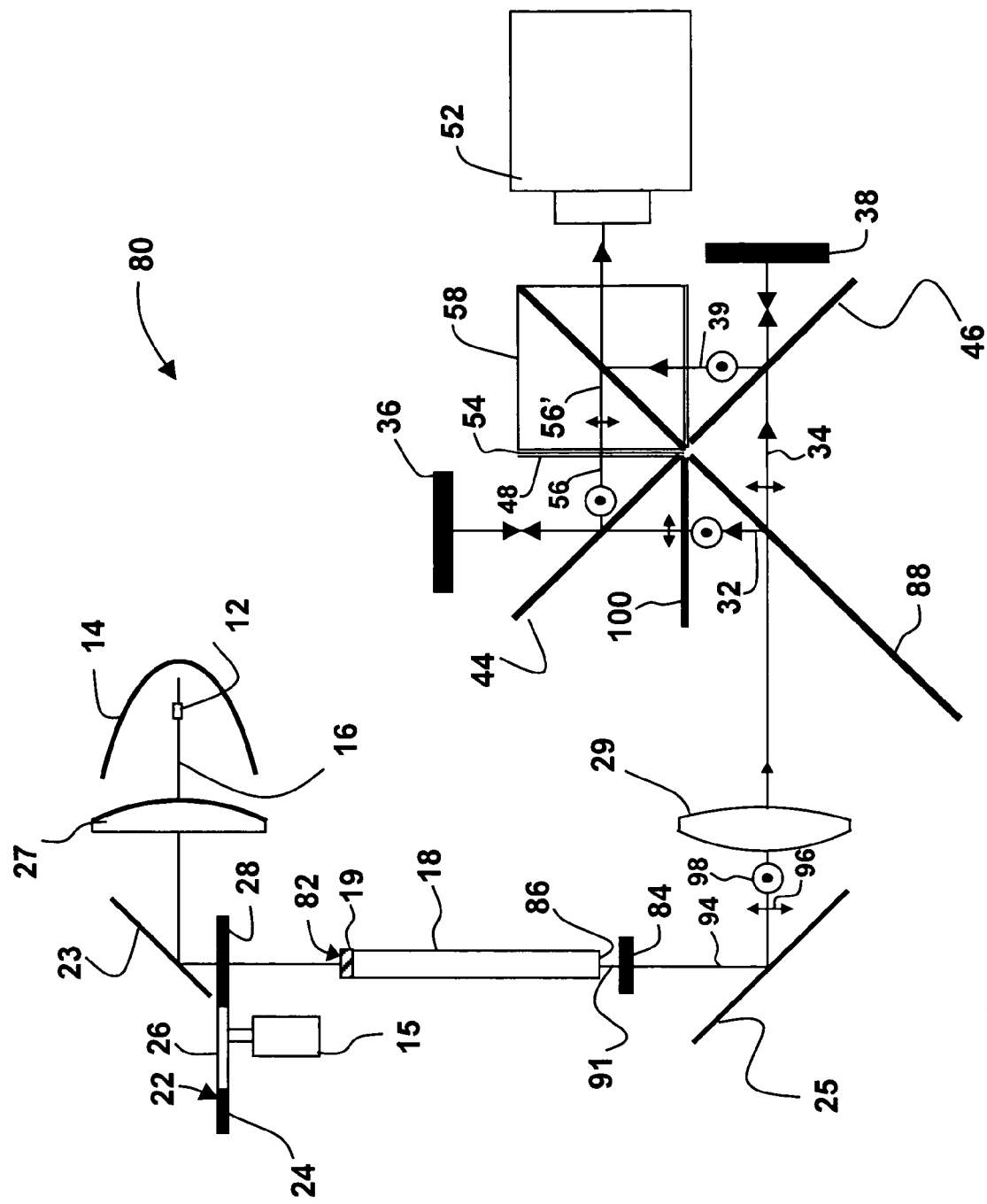
FIG. 5 illustrates a color management system with a color-selective polarizing switch according to yet another embodiment of the present invention.

FIG. 5 illustrates a color management system 80 according to yet another embodiment of the present invention, including many of the same elements as the color management systems 10 and 70; however, the primary color separator includes a transmissive liquid-crystal color-sensitive polarization switch 84 and a polarization beam splitter 88. The polarization switch 84 rotates the polarization state of light below (or alternatively above) a first selected wavelength emerging from the light pipe 18 when the color-sensitive polarization switch 84 is in a first "off" state, and below a second selected wavelength when the color-sensitive polarization switch 84 is in a second "on" state. For example, in the off state, the color-sensitive polarization switch 84 rotates the polarization state of a first primary color light beam, e.g. red, but not the second or third primary color light beams, e.g. green or blue light, and in the on state the color-sensitive polarization switch 84 rotates the polarization state of the first and second primary color light beams, e.g. red and green light, but not the third, e.g. blue light.

In this embodiment the polarization converter 19 or a functionally equivalent alternative is particularly important, since the polarization switch 84 requires polarized light. Instead of the polarization converter 19, a standard light pipe 18 with a wire-grid-type prepolarizer at an output face 86 thereof or a polarized light source (lamp) can be used. Even if a polarization converter 19 is used, adding a wire-grid-type prepolarizer (not shown) between the exit face 86 of the light pipe 18 and the liquid crystal polarization switch 84 improves performance. A wire-grid-type polarizer is preferred in this location because the beam is orthogonal to the face of the polarizer and it is desirable to not split the beam. In some embodiments, a pre-polarizer is included in the first color-sensitive polarizing switch 84.

The polarization beam splitter 88 can include a low-optical quality, e.g. non-optically flat, wire grid polarizing beamsplitter 88 for dividing the illumination light into the first and second optical paths 32 and 34. A low-quality beamsplitter is acceptable because the light has not yet been imaged. After imaging, high-quality beamsplitters/beamcombiners are desirable to maintain image quality. Alternatively, a high-quality wire grid polarizing beamsplitter or other polarizing beamsplitter can be used. The spectral content of the light in the first and second optical paths 32 and 34 is modulated by the color wheel dichroic filters 24, 26, 28 and by the transmissive color-sensitive liquid-crystal polarization switch 84.

White-balancing of this color management system 80 is possible by adjusting the angular dimensions of the dichroic filters 24, 26, 28 on the color wheel 22 in conjunction with the electrical timing of the operation of the transmissive liquid-crystal polarization switch 84.

Unlike the color wheel in a conventional one-panel system, which incorporates dichroic filters that transmit only one primary color per filter, e.g. red, green, or blue, the color wheel 22 for this embodiment of the invention uses secondary color segments, e.g. magenta 24, yellow 26, and cyan 28 dichroic filters, so that at any instant in time two primary colors, e.g. red+blue, blue+green, or green+red, are transmitted into the illumination path.

The post light pipe transmissive liquid crystal polarization switch 84 selectively changes the polarization state of one spectral component 98, e.g. the first primary colored beam, of the transmitted polarized light 91, e.g. the first secondary colored beam, relative to the other spectral component 96, e.g. the second primary colored beam, in order to route each of the two spectral components 96 and 98 of the transmitted polarized light 91 to the first or the second imager panels 36 and 38 via the wire grid polarizing beamsplitter 88 (hereinafter referred to the 'input WG-PBS').

To understand how this would work in practice, consider that the polarization state of the light 91 emerging from the light pipe 18, which may have been cleaned-up by a small pre-polarizer at the light pipe exit face 86, is p-polarized relative to the input WG-PBS 88. The transmissive liquid crystal polarization switch 84 is designed in such a way that, when unaddressed (off-state), it leaves the polarization state of second and third primary colored light beams, e.g. green and blue light, unaltered, but rotates the polarization state of the first primary colored light, e.g. red light, by 90°. Thus, the light beam 94 leaving the transmissive liquid crystal polarization switch 84 has both p-polarized light, e.g. blue or green light, represented by spectral component (double-ended arrow) 96, and s-polarized light, e.g. red light, represented by spectral component (circle and dot) 98.

In the unaddressed ("off") state, the second and third primary colored light beams 92, e.g. green and blue light, which remains p-polarized, is routed along the second path 34 to the second LCoS imager panel 38 through the input WG-PBS 88, and the first primary colored light beam, e.g. red light 90, which is now s-polarized, is reflected off of the input WG-PBS 88 and routed along the first path 32 to the first LCoS imager panel 36. Thus, the liquid-crystal polarization switch 84 functions essentially as a color-selective half-wave retarder plate. After the input WG-PBS 88, the first primary colored light beam, e.g. red light, passes through another half-wave retarder plate 100 to return the state of polarization to the original polarization state, e.g. p-polarized, in addition to the half-wave retarder plate 48 and analyzer 54 described above in reference to FIG. 1.

Figure 6:
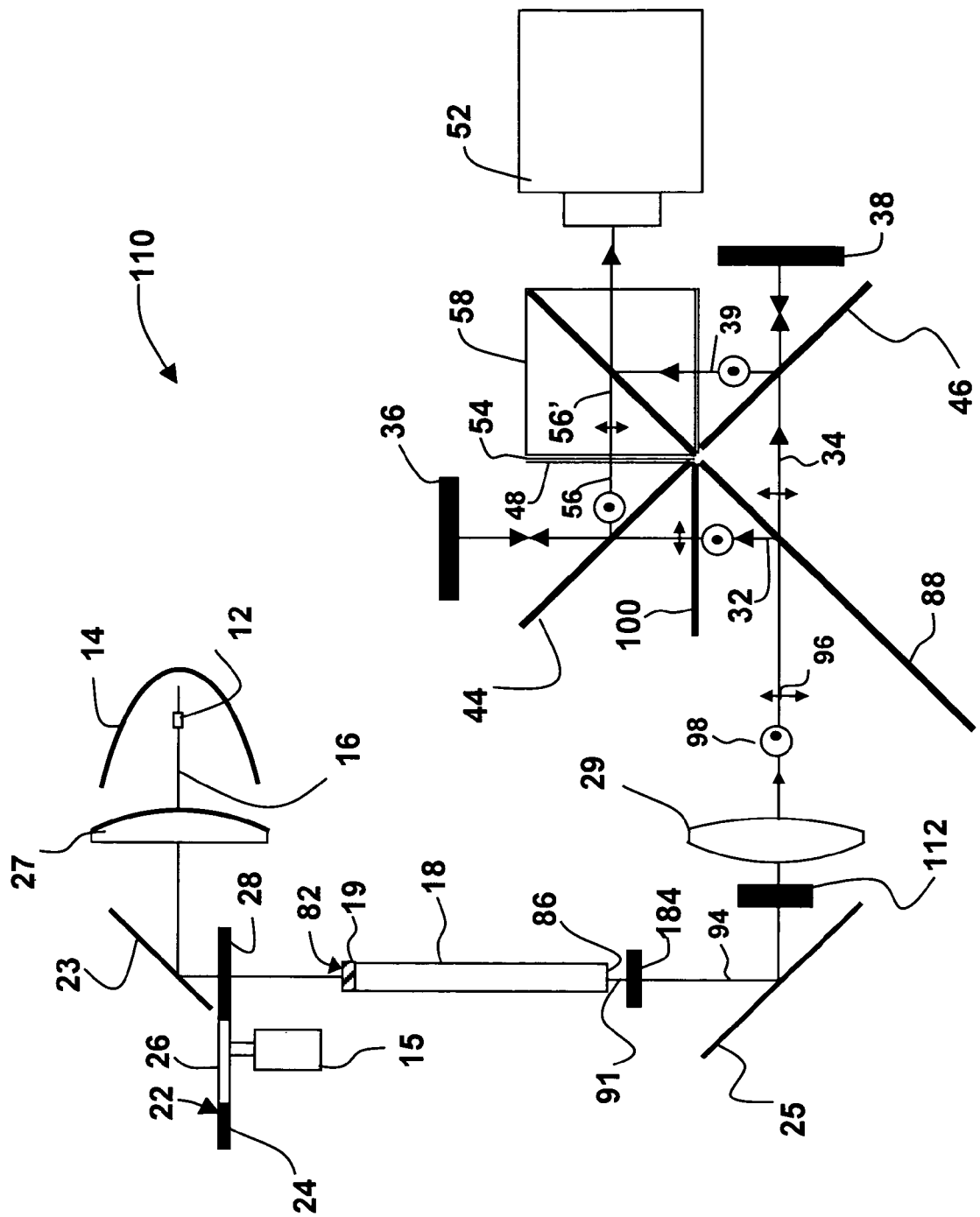
FIG. 6 illustrates a color management system with a color-selective polarizing switch and passive color-selective retarder plate according to yet another embodiment of the present invention.

In the addressed ("on") state, the spectral edge of the transition between polarization-rotated and non-polarization-rotated light shifts from between the first and second primary colored light wavelengths to between the second and third primary color light wavelengths, e.g. from the green/red transition wavelengths of roughly 590 nanometers (nm) to 600 nm, to the blue/green transition wavelengths of roughly 495 nm to 505 nm. Activation of the transmissive liquid-crystal polarization switch 84 in the on state is synchronized to coincide with the third secondary color segment 28, e.g. cyan (blue+green), of the color wheel 22 intersecting the light 16 from the arc lamp 12. When the liquid-crystal polarization switch 84 is activated, the third primary colored light beam, e.g. blue light, is transmitted without a change in polarization state, and the polarization state of the second primary colored light beam, e.g. green light, is rotated 90°. Accordingly, the second primary colored light beam, e.g. green light, is reflected off of the WG-PBS 88 along the first path 32 to the first imager panel 36, while the third primary colored light beam, e.g. blue light, is transmitted through the WG-PBS 88 along the second path 34 to the second imager panel 38. In this embodiment the first imager panel 36 is a red/green imager and the second imager panel 38 is a green/blue imager FIG. 6 illustrates a color management system 110 according to yet another embodiment of the present invention, in which the primary color separator includes an active color-sensitive polarization switch 184 and a passive color-sensitive polarization switch 112. The active color-sensitive polarization switch 184 transmits all three of the primary colors, i.e. red, green, and blue light, without rotation of their polarization states when in the first "off" condition. In the second "on" condition, the active color-sensitive polarization switch 184 rotates the polarization state of light below (or alternatively above) a selected wavelength, i.e. a first primary colored light beam. For example, in the on condition, the active color-sensitive polarization switch 184 transmits the second or third primary colored light beams, e.g. the green or the blue light, without rotation of their polarization states, and transmits the first primary colored light beam, e.g. the red light, with a 90° polarization rotation.

The passive polarizing rotation filter 112 transmits the first and third primary colored light beams, e.g. red and blue light, without changing their polarization states, and transmits the second primary colored light beam, e.g. green light, with a 90° rotation of its polarization state. Such passive polarizing rotation filters are available from COLORLINK®. Accordingly, when the first secondary color light beam, e.g. magenta light, is emitted from the light pipe 18, the color-sensitive polarization switch 184 is in the on state, thereby rotating the polarization state of the first primary colored light beam, e.g. red light, but not the third primary colored light beam, e.g. blue light, forming orthogonally polarized components 96 and 98. The passive polarizing rotation filter 112 has no effect on the polarization states of the first or third primary colored light beams, e.g. the red light or the blue light; therefore, since the first and third primary colored light beams are orthogonally polarized, the input WG-PBS 88 splits the first primary colored light beam, e.g. the red light, from the third primary colored light beam, e.g. the blue light, and directs the first primary colored light beam along the first path 32 to the first imager panel 36, and the third primary colored light beam, e.g. the blue light, along the second path 34 to the second imager panel 38.

When the second secondary colored light beam, e.g. yellow light, is emitted from the light pipe 18, the color-sensitive polarization switch 184 is switched to the off state thereby having no effect on the polarization state of the light 91 leaving the light pipe 18. However, the passive polarizing rotation filter 112 will transmit the first primary colored light beam, e.g. the red light, unaltered, while rotating the polarization state of the second primary colored light beam, e.g. the green light, by 90° forming orthogonally polarized components 96 and 98. Accordingly, the WG-PBS 88 splits the first primary colored light beam, e.g. the red light, from the second primary colored light beam, e.g. the green light, and directs the first primary colored light beam, e.g. the red light, along the second path to the second imaging panel 36, and the second primary colored light beam, e.g. the green light, to the first imaging panel 36.

When the third secondary colored light beam, e.g. cyan light, is emitted from the light pipe 18, the active color-sensitive polarization switch 184 is once again switched to the off state, and the passive polarizing rotation filter 112 transmits the third primary colored light beam, e.g. the blue light, unaltered, while rotating the polarization state of the second primary colored light beam, e.g. the green light, 90° forming orthogonally polarized components 96 and 98. The WG-PBS 88 splits the second primary colored light beam, e.g. the green light, from the third primary colored light beam, e.g. the blue light, and directs the second primary colored beam, e.g. the green light, along the first path 90 to the first imaging panel 36, and the third primary colored beam, e.g. the blue light, along the second path 92 to the second imaging panel 38. Once again, the color and polarization states used herein are merely exemplary. For example, a passive color-selective retarder that rotates two of the primary colors, e.g. the first and third primary colored beams (the blue and red light), but not the other, e.g. the second (the green light), is used in an alternative embodiment. Alternatively, a passive color-selective retarder that rotates the third primary colored light beam, e.g. the blue light, is also possible. In other words, the passive color-selective retarder 112 rotates the polarization of one of the other two primary colored light beams that the active color-sensitive polarization switch 184 does not. Using a green-magenta selective retarder allows the transition edge of the color-sensitive polarizing switch to be between the blue-green edge and the green-red edge, in other words, the exact location of the transition edge is not critical.

Moreover, the system can be designed so that the active color-sensitive polarization switch 184 rotates the polarization of any one or more of the primary colors, and the passive color-sensitive polarization switch rotates the polarization of any one of the other primary colors, as long as any two primary colored light beams can be separated by the WG-PBS 88.

As above, with reference to FIG. 5, the primary colored light beam traveling along the first path 32 passes through another half-wave retarder plate 100 to return the state of polarization to the original polarization state, e.g. p-polarized, whereby the light is directed to the first imaging panel 36 and manipulated as above forming the combined projection beam 51.

Figure 7:
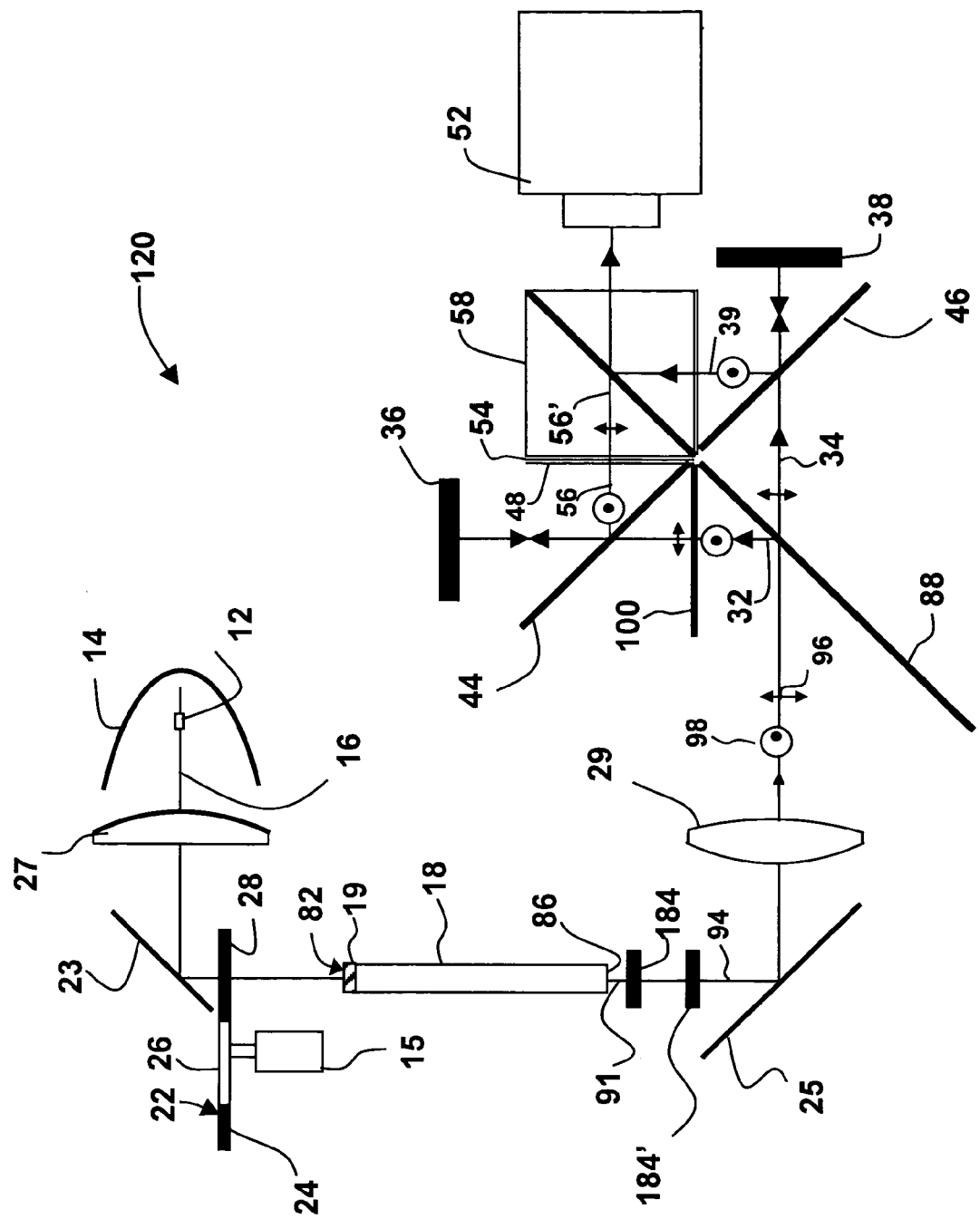
FIG. 7 illustrates a color management system with two color-selective polarizing switches according to yet another embodiment of the present invention.

FIG. 7 illustrates a color management system 120 according to yet another embodiment of the present invention, which has many of the same elements as the aforementioned embodiments, except that the primary color separator includes a second active color-sensitive polarization switch 184' instead of the passive polarizing rotation filter 112. Like the first active color-sensitive polarization switch 184, the second active color-sensitive polarization switch 184' transmits all three primary colored light beam, i.e. red, green, and blue light, without rotation of the polarization state thereof when in the off condition. If, as in the example described above in reference to FIG. 6, the first active color-sensitive polarization switch 184 in the on condition transmits the second and third primary colored light beams, e.g. the green light and the blue light, without rotation of the polarization states thereof, and transmits the first primary colored light beam, e.g. the red light, with a 90° polarization rotation, the second active color-sensitive polarization switch 184' in the on condition transmits the first and second primary colored light beams, e.g. the red and green light, without rotation, and transmits the third primary colored light beam, e.g. the blue light, with 90° of polarization rotation. However, the system can be designed so that the first active color-sensitive polarization switch 184 rotates the polarization of any one or more of the primary colors, and the second active color-sensitive polarization switch 184' rotates the polarization of any one of the other primary colors, as long as any of the two primary colored light beams in any one of the secondary colored light beams can be separated by the WG-PBS 88.

Thus, when the third secondary filter segment 28, e.g. cyan, in the color wheel 22 is in the light path, the first active color-sensitive polarization switch 184 is off and the second active color-sensitive polarization switch 184' is on, thereby rotating the polarization of the third primary colored light beam, e.g. the blue light, by 90° forming orthogonally polarized components 96 and 98. Accordingly, the WG-PBS 88 transmits the second primary colored light beam, e.g. the blue light, along the second path 34 to the second imager panel 38, while reflecting the third primary colored light beam, e.g. the green light, along the first path 32 to the first imager panel 36. When the first or second secondary color filter segments, e.g. the magenta filter segment 24 or the yellow filter segment 26, are in the light path, the first active color-sensitive polarization switch 184 is in the on condition, and the second color-sensitive polarization switch 184' is in the off condition, whereby the polarization state of the first primary colored light beam is rotated relative to the polarization of the second or the third primary colored light beams. Accordingly, the WG-PBS 88 reflects the first primary colored light beam, e.g. the red light, along the first path 32 to the first imager panel 36, while transmitting the second and third primary colored light beams, e.g. the green or the blue light, along the second path 34 to the second imager panel 38. Alternatively, when the first secondary color filter segment 24, e.g. magenta filter segment, is in the light path, the first active color-sensitive polarization switch 184 is in the off conditions, and the second active color-sensitive polarization switch 184' is in the on condition, whereby the polarization state of the third primary colored light beam, e.g. blue light, is rotated by 90°, and reflected by the WG-PBS 88 along the first path 32 to the first imager panel 36, while the polarization state of the first primary colored light beam, e.g. red light, is unaffected, and transmitted by the WG-PBS 88 along the second path 34 to the second imager panel 38.

The invention has been described above in reference to specific embodiments. Alterations, modifications, and improvements may occur to those skilled in the art. Such alterations, modifications, and improvements are intended to be within the spirit and scope of the invention. Accordingly, the foregoing description is by way of example only, and is not intended as limiting. The invention is limited only by the following claims and equivalents thereto.

We claim:

1. A color management system comprising:
    a light source for generating a source beam of polarized or unpolarized light;
    a secondary color selector for selectively separating a first or a second secondary color beam from the polarized or unpolarized source beam of light, the first secondary color beam comprising first and second primary colored beams, and the second secondary colored beam comprising first and third primary colored beams;
    a primary color separator for separating the first secondary colored beam into the first and second primary colored beams, and the second secondary colored beam into the first and third primary colored beams;
    a first imager panel for imaging the first or the second primary colored beam;
    a second imager panel for imaging the second or the third primary colored beam; and
    a beam combiner for combining the first primary colored beam from the first imager panel with the second or the third primary colored beam from the second imager panel, or for combining the second colored beam from the first imager panel with the third colored beam from the second imager panel to form a projection beam.

2. The color management system according to claim 1, wherein the secondary color selector is also for selectively separating a third secondary colored beam from the source beam of light, the third secondary colored beam comprising second and third primary colored beams; and wherein the primary color selector is also for separating the third secondary colored beam into second and third primary colored beams.

3. The color management system according to claim 1, wherein the secondary color selector comprises a first color wheel having a first color filter segment for transmitting the first secondary colored beam from the light source, and a second color filter segment for transmitting the second secondary colored beam from the light source.

4. The color management system of claim 3, wherein the first color wheel includes a third color filter segment for transmitting a third secondary colored beam, the third secondary colored beam comprising second and third primary colored beams; and wherein the primary color selector is also for separating the third secondary colored beam into second and third primary colored beams.

5. The color management system of claim 2, wherein the primary color separator comprises a second color wheel disposed at an acute angle to the secondary colored beam from the secondary color selector, the second color wheel including a plurality of filter segments, each filter segment for separating one of primary colored beams from another of the primary colored beams, and for directing one of the primary colored beams towards the first imager panel and the other primary colored beams towards the second imager panel.

6. The color management system of claim 5, wherein the second color wheel comprises: a first filter segment for separating the first primary colored beam from the second or the third primary colored beam, and for directing the first primary colored beam at the first imager panel and the second or the third primary colored beam at the second imager panel; and a second filter segment for separating the second primary colored beam from the third primary colored beam, and for directing the second primary colored beam at the first imager panel and the third primary colored at the second imager panel.

7. The color management system of claim 2, further comprising a polarizing element for converting the polarization of the source beam to a selected polarization.

8. A color management system comprising:
a light source for generating a source beam of unpolarized light;
a first color wheel having a first secondary color filter segment transmitting a first secondary color beam, a second secondary color filter segment transmitting a second secondary color beam, and a third secondary color filter segment transmitting a third secondary color beam, the first color wheel rotatable for sequentially coupling one of the first color filter segment, the second color filter segment and the third color filter segment to the source beam;
a light integrator for homogenizing the first, second and third secondary color beams;
a polarization conversion element for polarizing the first, second and third secondary color light beams;
a primary color separator for separating the first secondary color beam into first and second primary color beams and directing the first and second primary color beams along first and second paths, respectively, for separating the second secondary color beam into first and third primary color beams and directing the first and third primary color beams along the first and second paths, respectively, and for separating the third secondary color beam into second and third color beams and directing the second and third color beams along the first and second paths, respectively;
a first imager panel for receiving the first or second primary color beams along the first path, and imaging the first or second primary color beams;
a second imager panel for receiving the second or third primary color beams along the second path, and imaging the second or third primary color beams; and
a beam combiner for combining the first color beam from the first imager panel with the second or the third primary color beam from the second imager panel, or for combining the second color beam from the first imager panel with the third color beam from the second imager panel to form a projection beam.

9. The color management system of claim 8, wherein the primary color separator comprises a second color wheel having a high-pass filter segment for separating the first primary colored beam from the second or the third primary colored beam, and for directing the first primary colored beam at the first imager panel and the second or the third primary colored beam at the second imager panel, and a low-pass filter segment for separating the second primary colored beam from the third primary color beam, and for directing the second primary colored beam at the first imager panel and the third primary colored at the second imager panel.

10. The color management system of claim 8, wherein each of the first, second and third secondary color filter segments are dichroic filter segments.

11. The color management system of claim 8, wherein an angular extent of at least one of the first secondary color filter segment, the second secondary color filter segment, the third secondary color filter segment, the high-pass dichroic filter segment, and the low-pass dichrioc filter segment is chosen so as to provide a selected white-point balance.

12. The color management system of claim 11, wherein the selected white-point balance is a color temperature of a black-body radiator between about 6,000° K and about 12,000 ° K.

* * * * *